(12) United States Patent
Wolf et al.

(10) Patent No.: US 11,814,020 B2
(45) Date of Patent: Nov. 14, 2023

(54) BRAKE CONTROL SYSTEM

(71) Applicant: Westinghouse Air Brake Technologies Corporation, Wilmerding, PA (US)

(72) Inventors: Charles L. Wolf, Olney, MD (US); Carl L. Haas, Walkersville, MD (US)

(73) Assignee: Westinghouse Air Brake Technologies Corporation, Wilmerding, PA (US)

(*) Notice: Subject to any disclaimer, the term of this patent is extended or adjusted under 35 U.S.C. 154(b) by 77 days.

(21) Appl. No.: 17/347,161

(22) Filed: Jun. 14, 2021

(65) Prior Publication Data

US 2022/0009462 A1    Jan. 13, 2022

Related U.S. Application Data

(60) Provisional application No. 63/049,449, filed on Jul. 8, 2020.

(51) Int. Cl.
*B60T 13/66* (2006.01)
*B60T 17/22* (2006.01)

(52) U.S. Cl.
CPC .......... *B60T 13/665* (2013.01); *B60T 17/228* (2013.01); *B60T 2260/09* (2013.01)

(58) Field of Classification Search
CPC .... B60T 17/228; B60T 8/3235; B60T 8/1705; B60T 13/665; B60T 2260/09; B61H 13/00
USPC ............................................................ 303/7
See application file for complete search history.

(56) References Cited

U.S. PATENT DOCUMENTS

| | | | |
|---|---|---|---|
| 5,494,342 A * | 2/1996 | Engle | B60T 13/585 303/3 |
| 8,838,302 B2 | 9/2014 | Kumar et al. | |
| 9,045,123 B1 * | 6/2015 | Cooper | B61H 13/00 |
| 9,481,348 B2 | 11/2016 | Wolf | |
| 9,669,811 B2 | 6/2017 | Brooks et al. | |
| 10,399,551 B2 | 9/2019 | Naylor et al. | |
| 10,464,584 B2 | 11/2019 | Rice et al. | |
| 2005/0189815 A1* | 9/2005 | Bryant | B61C 17/12 303/3 |

(Continued)

FOREIGN PATENT DOCUMENTS

| | | |
|---|---|---|
| AU | 2021202236 A1 | 11/2021 |
| WO | 2019005071 A1 | 1/2019 |
| WO | 2019108243 A1 | 6/2019 |

OTHER PUBLICATIONS

First Examination Report dated Aug. 31, 2022 for corresponding AU Patent Application No. 2021204296 (8 pages).

(Continued)

*Primary Examiner* — Robert A. Siconolfi
*Assistant Examiner* — San Mau Ng
(74) *Attorney, Agent, or Firm* — THE SMALL PATENT LAW GROUP LLC; Mary D. Lawlor (57) ABSTRACT

A braking system and method control application of brakes disposed onboard vehicles using brake control devices. The vehicles are in a multi-vehicle system and are associated with different segments of the vehicle system. Brake commands are sent to the brake control devices. These commands direct the brake control devices of the vehicles to concurrently engage the brakes onboard the vehicles to different brake levels based on which of the segments that the vehicles are associated.

19 Claims, 5 Drawing Sheets

(56) References Cited

U.S. PATENT DOCUMENTS

| | | | |
|---|---|---|---|
| 2006/0012246 A1* | 1/2006 | Smith | B61L 3/127 |
| | | | 303/155 |
| 2010/0235022 A1* | 9/2010 | Siddappa | B61L 3/006 |
| | | | 303/151 |
| 2017/0232943 A1* | 8/2017 | Brooks | B60T 7/128 |
| | | | 701/19 |
| 2019/0168728 A1* | 6/2019 | Venkatasubramanian | |
| | | | B60T 13/665 |
| 2019/0276055 A1 | 9/2019 | Cooper et al. | |
| 2020/0001857 A1 | 1/2020 | Naylor et al. | |
| 2020/0017084 A1 | 1/2020 | Rice et al. | |
| 2020/0130658 A1 | 4/2020 | Wolf et al. | |
| 2020/0164843 A1 | 5/2020 | Chen et al. | |

OTHER PUBLICATIONS

First Examination Report dated Mar. 16, 2022 for corresponding Indian Patent Application No. 202114029370 (6 pages).
Wei et al. "Study on a segmented electro-pneumatic braking system for heavy-haul trains", Research Article, Transportation Safety and Environment, 2020, vol. 2, No. 3 216-225.
Office Action for corresponding Canadian application No. 3,123421 dated Jan. 18, 2023 (4 pages).
Office Action for corresponding Canadian application No. 3,123421 dated Jul. 14, 2023 (4 pages).

\* cited by examiner

BRAKE CONTROL SYSTEM

CROSS-REFERENCE TO RELATED APPLICATIONS

This application claims priority to U.S. Provisional Patent Application No. 63/049,449, which was filed on 8 Jul. 2020, and the entire disclosure of which is incorporated herein by reference.

BACKGROUND

Technical Field

The subject matter described herein relates to systems and methods that control braking in multi-vehicle systems.

Discussion of Art

Some vehicle systems are formed from multiple vehicles that move together along routes. For example, rail vehicle systems (e.g., trains) may be formed from one or more locomotives and one or more rail cars. Braking in these vehicle systems can be implemented using an air brake system having a brake pipe that extends along the length of the vehicle system. Air brakes onboard the vehicles (e.g., locomotives and rail cars) can be controlled by propagating changes in pressure along the length of the brake pipe.

Some rail vehicle systems have electronically controlled pneumatic (ECP) brakes. The ECP brakes are air brakes that are controlled via train brake command signals that are communicated to the ECP brakes via a cable (e.g., a train line). The ECP brakes allow for more rapid engagement of brakes along the length of the vehicle system. For example, instead of braking along the length of the vehicle system being delayed due to the time needed for a pressure decrease to propagate along the length of the vehicle system, the ECP brakes can be engaged at the same time by electronically sending the command signals via the cable.

But, some known brake systems that use ECP brakes are limited to directing all brakes in the vehicle system braking at the same time and at the same braking level. Not all braking situations, however, are best handled by all air brakes being engaged at the same time and at the same level.

BRIEF DESCRIPTION

In one embodiment, a braking system is provided that includes brake control devices configured to be disposed onboard different vehicles of a multi-vehicle system. Each of the brake control devices is configured to control application of a brake disposed onboard the respective vehicle of the vehicles. The vehicles in the multi-vehicle system are associated with different segments of the vehicle system. The braking system also includes a controller configured to send brake commands to the brake control devices. The brake commands direct the brake control devices of the vehicles to concurrently engage the brakes onboard the vehicles to different brake levels based on which of the segments that the vehicles are associated.

In one embodiment, a method for controlling braking is provided. The method includes assigning vehicles in a multi-vehicle system to different segments of the multi-vehicle system and determining a brake level to be applied by a brake control device disposed onboard each of the vehicles in each of the segments. The brake level to be applied by the vehicles in a first segment of the segments differs from the brake level to be applied by the vehicles in a different, second segment of the segments. The method also includes concurrently engaging brakes of the vehicles in the segments according to the brake levels of the segments.

In one embodiment, a method for segmented braking in a multi-vehicle system is provided. The method includes assigning vehicles in the multi-vehicle system to different segments of the multi-vehicle system based on one or more of positions of the vehicles in the multi-vehicle system, names of the vehicles in the multi-vehicle system, or network addresses of the vehicles in the multi-vehicle system. The method also includes communicating a brake command to brake control devices onboard the vehicles from a lead vehicle of the vehicles via one or more wired connections, wireless connections, or a combination of the wired connections and the wireless connections. The brake command directs the brake control devices in a first segment of the segments to control brakes of the vehicles in the common segment to concurrently engage the brakes to a first brake level. The brake command also directs the brake control devices in a different, second segment of the segments to control the brakes of the vehicles in the second segment to concurrently engage the brakes to a different, second brake level.

BRIEF DESCRIPTION OF THE DRAWINGS

The inventive subject matter may be understood from reading the following description of non-limiting embodiments, with reference to the attached drawings, wherein below.

DETAILED DESCRIPTION

One or more embodiments of the inventive subject matter described herein provide brake control systems and methods that allow for segmented braking in a multi-vehicle system. The control systems and methods may be used to control segmented braking in a brake system of a multi-vehicle system using ECP-controlled brakes onboard vehicles of the vehicle system. While one or more embodiments of the inventive subject matter described herein relate to rail vehicle systems (e.g., trains formed of locomotives and rail cars), not all embodiments of the inventive subject matter are limited to rail vehicle systems. Alternatively, one or more embodiments can be performed using non-rail vehicle systems, such a brake systems onboard trucks (pulling trailers), transit vehicle systems, or the like.

Segmented braking allows for different segments of vehicles in a multi-vehicle system to brake at different levels under control of a driver of the vehicle system and/or an onboard vehicle control system. For example, the vehicles (e.g., rail cars) in the front half of the vehicle system can be commanded to brake at 45% (of an upper braking level or setting) while the vehicles in the back half of the same vehicle system can be commanded to brake at 20% (at the same time that the front half vehicles are commanded to brake at 45%).

Segmented braking can be used to improve handling of vehicle systems. For example, a segment of a vehicle system heading down a grade can have increased braking while a segment of the same vehicle system heading up a grade at the same time can have reduced braking (or no braking). Additionally, different segments of a vehicle system can be stretched or compressed by individually controlling braking in different segments of the vehicle system.

The brake control systems and methods can communicate (e.g., transmit and/or broadcast) a single braking command to vehicles in the same vehicle system at the same time. The commands can be electronically communicated via wired connections, wireless connections, or a combination of wired and wireless connections. The commands can be communicated using a variety of communication protocols, including Ethernet, CAN BUS, or the like.

The braking command can individually identify how different vehicles are to brake to segment the braking within the vehicle system, as described herein. Each vehicle then applies the brake of that vehicle according to the commanded brake setting for that vehicle. For example, the single braking command can include multiple command fields, with each command field applicable for a different segment of the vehicle system. This method of communicating the brake commands can reduce the overall message overhead needed to implement segmented braking (relative to communicating a separate command for each vehicle). Each of the vehicles can examine the single braking command, determine which field directs the braking of the segment that includes that vehicle, and then apply the brakes of that vehicle accordingly. The braking command can be a simple on or off command that engages or disengages the brakes in the segment receiving the command. The braking command can give a percentage, fraction, or other value that indicate the braking force to be applied (with smaller percentages, fractions, or values resulting in smaller braking forces). Optionally, the braking command can direct the brakes to gradually engage or disengage to the commanded level. For example, instead of the brakes receiving the braking command directly switching to the commanded braking level without any intentionally added delay, the braking command can direct the brakes to change to the commanded braking level gradually over time, with some temporal delay added so that the brakes do not immediately jump to the commanded braking level. Alternatively, the brakes receiving the braking command can directly switch to the commanded braking level without any intentionally added delay.

The control system and method can use fixed block segment assignments of the vehicles and/or moving block segment assignments of the vehicles to determine which segment each vehicle is associated or assigned. These types of assignments can allow for a human operator to manually assign vehicles to different segments and/or can allow for automated assignment of vehicles. In one embodiment, the control system and method can use a route database that stores the layout, grades, curvatures, etc., of different routes. The control system and method can refer to the route database to determine how to control and dynamically change the segments based on characteristics of the route being traveled upon.

With respect to fixed block segment assignments, the vehicles in a vehicle system can be assigned to a segment based on identifiers of the vehicles. For example, each vehicle may have a name (e.g., CSX1357), address (e.g., network address), or the like, that is unique to that vehicle (unique within the vehicle system and/or unique among all vehicles within or outside of the vehicle system in different embodiments). In one embodiment, the identifier for a vehicle can be the ECP assigned name of the vehicle. The vehicles may be assigned to fixed block segments using the identifiers of the vehicles. For example, if the fifth vehicle in the vehicle system is marked as CSX1357 and has been assigned to have an ECP network address of subnet 001/ address 010, then a message can be sent to this vehicle (e.g., to CSX1357 Subnet/Node 001/010) to assign that vehicle to a first segment. Other messages can be sent to other vehicles within the same vehicle system to assign those vehicles to the first segment or one or more other segments.

With respect to dynamic moving segment assignments, each of the vehicles in a vehicle system can self-select which segment that the vehicles are assigned based upon the physical position of the vehicle in the vehicle system. In one implementation, a driver of the vehicle system can manually assign new braking command levels at specific positions that a designated vehicle (e.g., a lead locomotive or another locomotive or railcar) reaches along a route. Each new segment assignment can define a beginning of a segment to be included in a braking command. For example, an expanded broadcast message can direct vehicles 1 through 20 (of a vehicle system having 150 vehicles) to be in a first segment having brakes released, vehicles in positions 21 through 100 to be in a second segment having the brakes engaged at 10%, and vehicles in positions 101 through 150 to be in a third segment having brakes engaged at 50%. Each vehicle can self-compare the known position of the vehicle with the segment assignments based on vehicle position to determine which segment that the vehicle is in. The vehicles can then self-select the braking levels to apply for the respective vehicles based on the braking command. For example, the vehicle at position 130 will determine that the vehicle is in the third segment (and apply the brake of that vehicle at 50%).

These segments can be dynamically updated during movement of the vehicle system. For example, if the vehicle system moves forward along a route by a designated distance (e.g., the length of one of the vehicles in the vehicle system), the segments can be redefined. The first segment can include the vehicles in positions 1 through 21 (instead of the prior inclusion of the vehicles in positions 1 through 20), the second segment can include the vehicles in positions 22 through 101 (instead of the prior inclusion of the vehicles in positions 21 through 100), and the third segment can include the vehicles in positions 102 through 150 (instead of the prior inclusion of the vehicles in positions 101 through 150). This can ensure that interior segments (e.g., not the exterior segments at the leading end and the trailing end of the vehicle system) remain at a fixed size or fixed number of vehicle positions, while the exterior segments change size or number of vehicles. For example, the leading segment may increase in size or number of vehicles in direct relationship with the trailing segment (e.g., as the trailing segment decreases by a vehicle position, the leading segment increases by an additional vehicle position).

Optionally, the segments may be dynamically changed based on passage of the vehicle system by locations along routes. As one example, when a designated vehicle (e.g., the leading vehicle or leading locomotive along the leading end of the vehicle system) reaches an optimum location along a route (e.g., optimum for braking or changing braking values relative to one or more other locations), new braking command values can be determined for different segments of the vehicle system. Each of the vehicles can self-determine when the vehicles will reach the location (e.g., based on the position of the vehicles in the vehicle system and the speed at which the vehicle system is moving). When each vehicle determines that the vehicle has reached the location (which can be referred to herein as a brake command transition point or location), the vehicle changes engagement of the brake of the vehicle according to the brake command. For example, prior to reaching the transition point, a vehicle may engage the brake of the vehicle at 10%. Once the vehicle reaches the transition point, the vehicle may change engagement of the brake to 50%. Other vehicles may similarly change brake engagement responsive to reaching the transition point. The vehicles may keep the brakes engaged according to the most recently reached transition point according to the commanded engagement until the vehicles reach the next transition point.

The brake commands associated with the transition points can be manually set by an operator of the brake system (e.g., when the vehicle system reaches the transition points). Optionally, a comprehensive braking command profile can be created as part of a route database. This profile can dictate different braking commands for different transition points along one or more routes. The vehicle system (e.g., a controlling vehicle that controls movement of the other vehicles) can determine when the leading vehicle reaches a transition point (e.g., using a location determining device, such as a global positioning system receiver). The controlling vehicle can broadcast the brake commands and the vehicles can determine when to apply the brakes accordingly, as described above. The controlling vehicle may be disposed at a leading end of the vehicle system, but optionally may be located in another position within the interior of the vehicle system (e.g., when the controlling vehicle is not at the leading or trailing end of the vehicle system) or at the trailing end of the vehicle system.

In one example, each of the segments may include a sequential group of neighboring vehicles. For example, each segment may be a continuous segment formed of two or more vehicles and may include the vehicles immediately next to each other or coupled with each other. No other vehicles in another segment may be located between the vehicles in the same segment. Alternatively, a segment may be a discontinuous segment formed from vehicles that are not immediately adjacent or coupled with each other. For example, every fifth vehicle within a vehicle system may be assigned to a first segment and the remaining vehicles (e.g., the second through fourth vehicles, the sixth through ninth vehicle, etc.) may be assigned to a second segment.

A vehicle may be assigned to more than one segment. For example, one or more (or all) vehicles in the vehicle system may be assigned to multiple segments at the same time. A brake command can be communicated that directs different amounts of braking for different segments. A brake control device onboard each of the vehicles can determine which of the brake commands to be implemented by the brake onboard the corresponding vehicle. Stated differently, the brake control device can determine which segment that a vehicle is to brake according to using logic within the brake control device. The brake control device can determine which of the brake commands to implement based on a priority or other order among the assigned segments. For example, the multiple segments to which a vehicle is assigned may have a priority and the brake control device can select which segment has the highest priority for the vehicle. The brake control device may then direct the brake to implement the command associated with the highest priority segment. The order or priority of the assigned segments for a vehicle may change based on one or more conditions, such as a grade of the route, a curvature of the route, etc.

Optionally, the timing at which brake commands are implemented may be controlled. For example, the brakes can be controlled to ramp the brake command to an increased or decreased level at a slower timed transition rate. This can be used as the vehicle system traverses various features in or along the route. As one example, vehicles in a vehicle system that are cresting a hill can be commanded to more gradually change the braking levels of those vehicles as the vehicles move between segments. The desired rate of the brake command transition can be dynamically included in the command from the controlling vehicle.

The control of the segmented braking can be used in connection with one or more computerized systems, such as vehicle control systems. For example, an energy management system can determine trip plans that designate operational settings of the vehicle system (e.g., brake settings, throttle settings, etc.) as a function of time, distance, location, immediate or pending weather conditions, or the like, during a trip. These trip plans can be created to drive the vehicle system toward achievement of one or more objectives, such as reducing fuel consumption, reducing emission generation, etc., while arriving at a location within a designated period of time (e.g., according to a schedule). The brake settings in the trip plan and the associated locations or distances along the route can be used to determine the size of the vehicle segments, which vehicles are included in the segments, and/or transition points. Another example of a control system can be a positive vehicle control system, such as a positive train control system. These types of systems can restrict movement of vehicle systems into route segments based on movement authorities. For example, if a vehicle system has a movement authority to enter an upcoming route segment, then the positive control system can allow the vehicle system to enter the route segment. But, if the vehicle system does not have a movement authority to enter the upcoming route segment, the positive control system can engage the brakes to slow or stop movement of the vehicle system. The braking levels and locations for braking can be used by the brake control system to determine the size of the vehicle segments, which vehicles are included in the segments, and/or transition points.

In one embodiment, segmented braking within a vehicle system may be activated or deactivated at different times during movement of the vehicle system. For example, an operator or computerized system (e.g., an energy management system, distributed power control system, positive vehicle control system, etc.) can turn segmented braking off for a portion of travels of the vehicle system. Braking within the vehicle system may then change to another type of braking, such as ECP braking without braking according to segments. The segmented braking can later be turned back on to cause the vehicle system to revert back to segmented braking according to which segment each of the vehicles is assigned.

The decision to turn off segmented braking may be performed automatically or can be automatically recommended (to the operator) by the computerized system. For example, the computerized system may determine that an upcoming segment of a route may have too few undulations or other changes in grade, too few curves, or the like, for segmented braking to be efficient. This determination may occur responsive to the number of grade changes, the changes in grade, the number of curves, or the like, exceeding one or more designated thresholds. Optionally, the decision to turn segmented braking off may occur responsive to the vehicle system entering or encountering an emergency state or situation. For example, responsive to failure or damage to one or more components of the vehicle system (e.g., a motor, engine, converter, radio, or the like), segmented braking may be turned off and the vehicle system may default to ECP braking without segmented braking.

Responsive to turning segmented braking back on, the segments to which the vehicles are assigned may be the same as the segments to which the vehicles were assigned prior to deactivation of segmented braking. Alternatively, one or more of the vehicles may be re-assigned to a different segment responsive to turning segmented braking back on.

Figure 1:
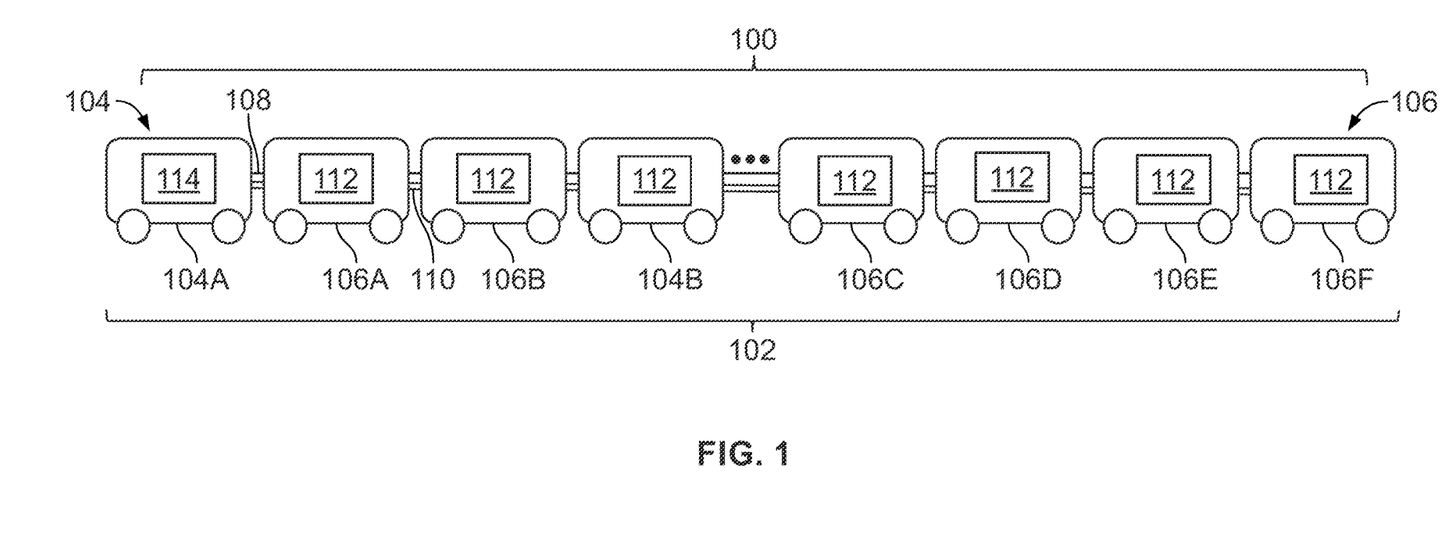
FIG. 1 illustrates one example of a brake control system.

FIG. 1 illustrates one example of a brake control system 100. The brake control system may be disposed onboard a multi-vehicle system 102 formed from plural vehicles 104, 106. The vehicles in the vehicle system are mechanically and/or fluidly coupled with each other in the illustrated embodiment. For example, the vehicles in the vehicle system may be mechanically coupled by couplers and fluidly coupled with each other by a brake pipe 110 of an air brake system that is onboard the vehicle system. The vehicles 104 (e.g., vehicles 104A, 104B) can be propulsion-generating vehicles that operate to move the vehicle system along routes (e.g., tracks, roads, paths, etc.). For example, the propulsion-generating vehicles can be locomotives, trucks, tractors, or the like. The vehicles 106 (e.g., vehicles 106A-F) can be non-propulsion-generating vehicles that are moved by the propulsion-generating vehicles. For example, the non-propulsion-generating vehicles can represent rail cars, trailers, etc. The number and arrangement of the vehicles shown in FIG. 1 is provided as one example. The ellipsis shown in FIG. 1 indicates that several more vehicles 104 and/or 106 may be in the vehicle system between the vehicle 104B and the vehicle 106C. The vehicle 104A may be referred to as a controlling vehicle that communicates with the other vehicles to control operation of the vehicles. For example, the controlling vehicle can send (e.g., broadcast and/or transmit) brake command signals or brake commands to the other vehicle(s) to direct brake settings of the other vehicle(s). While the controlling vehicle is shown at the leading end of the vehicle system, the controlling vehicle may not be at the leading end of the vehicle system, as described above. These other vehicles can include propulsion-generating vehicles and/or non-propulsion-generating vehicles. The communication of the commands may be performed wirelessly (e.g., using radio communications), via wired connections (e.g., via cables such as a trainline), or a combination thereof.

The control system includes brake control devices 112 disposed onboard the vehicles in the vehicle system. Each of the brake control devices represent hardware circuitry that controls a brake of the corresponding vehicle. The brake control device can represent an individually addressable ECP device that controls the brake to engage or release. The brake can be fluidly coupled with the brake pipe. The brake control device can direct the air brake to increase pressure in a brake cylinder to engage the brake or can control a valve to exhaust air from the brake cylinder to release the brake. The brake control device can be coupled with a cable 108 that extends along part or all of the vehicle system. The cable can represent a train line or other conductive pathway through which command signals are communicated to control engagement and release of the brakes. The command signals can be individually addressable to instruct the brake control devices onboard different vehicles to engage or release the brakes to different amounts, settings, etc. at the same time. Optionally, the brake control device can include and/or be coupled with one or more wireless communication devices, such as modems, antennas, or the like, so that the brake control device can wirelessly communicate brake commands (e.g., transmit, broadcast, and/or receive brake commands).

The brake control system includes a controller 114 onboard the controlling vehicle. The controller can represent hardware circuitry that includes and/or is connected with one or more processors (e.g., one or more microprocessors, one or more field programmable gate arrays, one or more integrated circuits, or the like). The controller can determine and send the braking commands to the brake control devices. Optionally, the controller can determine the vehicle segments to be used in segmented braking. The controller can broadcast brake control messages or brake commands to the brake control devices. These brake commands directing the brake control devices of the vehicles to concurrently engage the air brakes onboard the vehicles to different brake settings based on which of the segments that the vehicles are associated with.

The controller can define boundaries between segments of the vehicles. For example, a boundary may be defined (e.g., in an electronic record, in the brake commands, etc.) as being located between different segments of the vehicles. The controller can change which vehicles and/or how many vehicles are included in one or more of the segments by changing the location of the boundary.

As described above, in one embodiment, the vehicles can be assigned with fixed block segments and the controller in the controlling vehicle can send a brake command that dictates the brake setting to be implemented by the brake control devices in each of the fixed block segments. The controller can send assignment messages or signals to the brake control devices. These assignment signals can inform the brake control devices of which vehicles are in the different fixed block segments based on the identifiers of the vehicles. For example, one or more assignment signals can include a first set of names and/or network addresses of vehicles in the vehicle system that are to be included in a first fixed block segment, a different, second set of names and/or network addresses of other vehicles in the same vehicle system that are to be included in a second fixed block segment, a different, third set of names and/or network addresses of other vehicles in the same vehicle system that are to be included in a third fixed block segment, and so on. The assignments of vehicles may be made such that no vehicle is included in more than a single segment. Each of the brake control devices can then determine which segment that the corresponding vehicle of the brake control device is assigned. For example, the brake control device in each of the vehicles having names and/or addresses in the first set can determine that the brake control device is in the first fixed block segment. The brake control device in each of the vehicles having names and/or addresses in the second set can determine that the brake control device is in the second fixed block segment, and so on.

The controller can broadcast a brake command via the cable to the brake control devices or wirelessly via a radio communication. This brake command may instruct the brake control devices in the first fixed block segment to engage the brakes to 20% of a maximum braking effort, the brake control devices in the second fixed block segment to engage the brakes to 45% of the maximum braking effort, and the brake control devices in the third fixed block segment to engage the brakes to 50% of the maximum braking effort. Each of the brake control devices can receive the same brake command from the controller. Each of the brake control devices can then engage the corresponding brake according to the segment that the brake control device is assigned.

Optionally, the controller can assign the vehicles to dynamic segments. These segments that change which vehicles are included in the segments at different times, locations, or the like, during movement of the vehicle system. As described above, the controller can change which positions are included in different segments. For example, the controller can initially assign the vehicles in positions one through three (e.g., vehicles 104A through 106B) to be in a first segment, the vehicles in positions four and five (e.g., vehicles 104B, 106C with no vehicles between the vehicles 104B, 106C) to be in a second segment, and the vehicles in positions six through eight (e.g., the vehicles 106D through 106F) to be in a third segment. The controller can send a brake command directing the vehicles in these different segments to brake at levels associated with the different segments. Then, at a later time, the controller can change the first segment to include the vehicles in positions one through four (e.g., the vehicles 104A through 104B) to be in the first segment, the vehicles in positions five and six (e.g., vehicles 106C, 106D) to be in the second segment, and the vehicles in positions seven and eight (e.g., the vehicles 106E, 106F) to be in the third segment. The controller can send a brake command directing the vehicles in these different segments to brake at levels associated with the different segments.

The controller can continue changing the segments, such as by increasing the size of the segment at the leading end of the vehicle system, reducing the size of the segment at the opposite trailing end of the vehicle system, and keeping middle segments located between the segments at the leading and trailing ends of the vehicle system the same size or such as by increasing the size of the segment at the leading end of the vehicle system, reducing the size of the second segment and keeping the other middle segments and the opposite trailing end of the vehicle system the same size, or other possibilities. The brake control devices can determine which segment that the brake control devices are in based on the positions of the vehicles in the vehicle system. For example, during ECP sequencing, the position of the vehicle in which each brake control device is disposed may be determined and recorded at the brake control device.

The brake commands from the controller can identify different brake levels to be implemented for different segments. For example, the brake command can direct the first segment to engage brakes at 60%, the second segment to engage brakes at 30%, and the third segment to engage brakes at 50%. The brake command also can list the vehicle positions assigned to each of the segments. Alternatively, the brake command can list the brake levels associated with different positions.

When a brake command is received from the controller, each of the brake control devices can determine which braking level directed by the brake command is associated with the position of the vehicle in which the respective brake control device is located. For example, each brake control device can examine the brake command to determine the directed braking level associated with the position of the vehicle. The brake control device can then control the brake to implement the commanded brake level.

Figure 2:
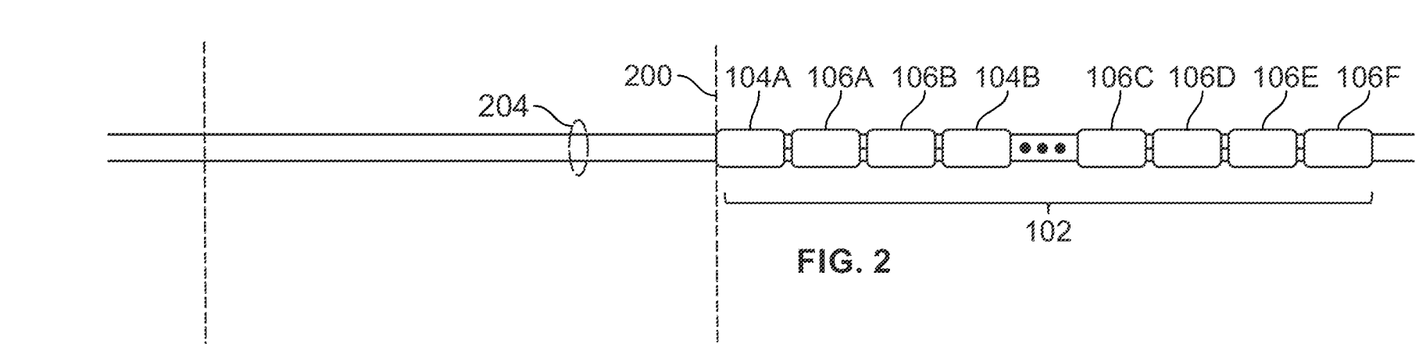
FIG. 2 illustrates one example of a vehicle system shown in FIG. 1 moving by a transition point for changing segments in the vehicle system.
Figure 3:
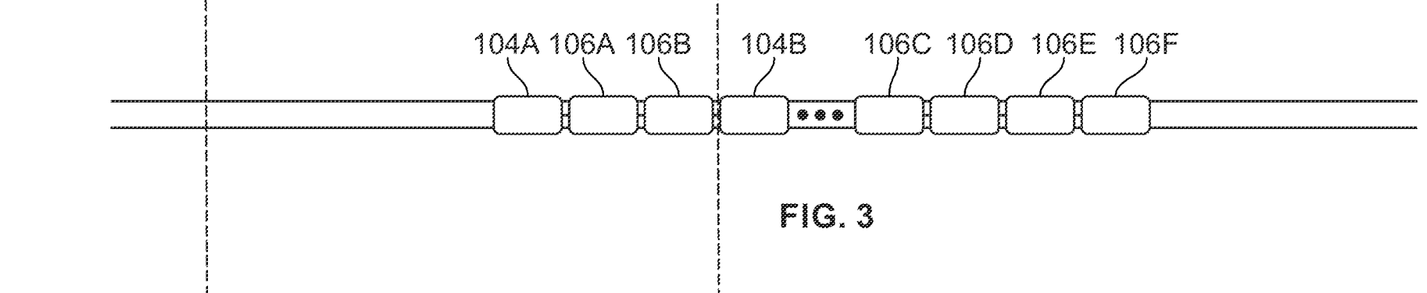
FIG. 3 illustrates the vehicle system shown in FIG. 2 moving by the transition point for changing segments in the vehicle system.
Figure 4:
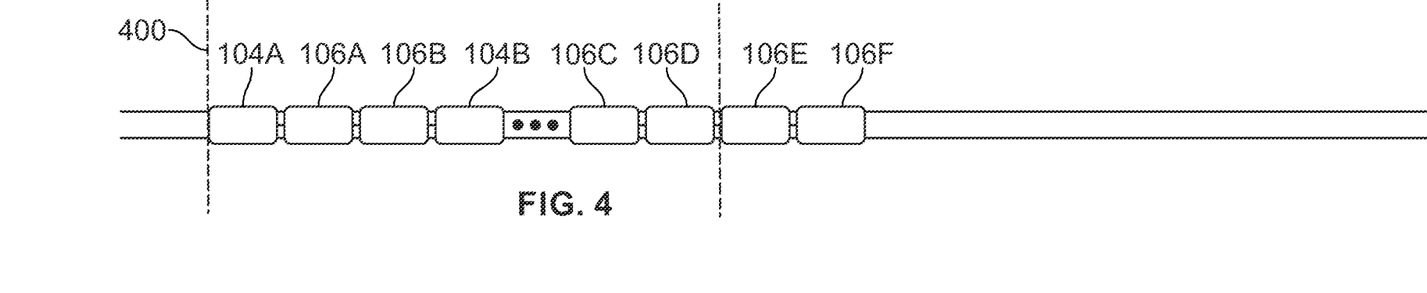
FIG. 4 illustrates the vehicle system shown in FIGS. 2 and 3 moving by another transition point for changing segments in the vehicle system.

FIGS. 2 through 4 illustrate one example of the vehicle system 102 shown in FIG. 1 moving by a first transition point 200 for changing segments in the vehicle system 102. In FIG. 2, an operator onboard the vehicle system or the controller can determine that the vehicles are to change brake levels when the vehicles reach the transition point. The controller can broadcast a brake command to the brake control devices instructing the brake control devices to change brake levels (e.g., to 40%) once the vehicles reach the first transition point along a route 204.

Prior to reaching the first transition point, each brake control device onboard the vehicles maintains the currently implemented braking level using the corresponding brake. For example, after the lead vehicle 104A has passed the first transition point but before the other vehicles 104B, 106A-F in the vehicle system reach the first transition point, the brake control devices onboard these other vehicles can control the respective brakes to maintain the currently implemented brake level (e.g., 10%). The brake control device onboard each vehicle can determine when that vehicle will reach the first transition point.

Each of the brake control devices can determine when the corresponding vehicle will reach the first transition point based on a speed at which the vehicle system is moving along the route and a distance along the length of the vehicle system between the corresponding vehicle and the lead vehicle. With respect to the vehicle 104B, the brake control device onboard the vehicle 104B can use the position of the vehicle 104B in the vehicle system to determine that the vehicle 104B is 180 feet (or 54.6 meters) from the lead vehicle and that the vehicle system is moving at a speed of twenty-five miles per hour (or 40.2 kilometers per hour). Based on this information, the brake control device can determine that the vehicle 104B will reach the first transition point in 4.8 seconds. Accordingly, the brake control device onboard the vehicle 104B will control the air brake onboard the vehicle 104B at a current brake level for the next 4.8 seconds and then change control of the air brake to increase the brake level to 40% (as the vehicle 104B reaches the first transition point, as shown in FIG. 3). Other brake control devices disposed onboard other vehicles also control the respective brakes to maintain the brake level until the vehicles each reach the first transition point. Once the brake control devices determine that the respective vehicle reaches the first transition point, the brake control devices control the respective brakes to change the brake level (e.g., to 40%). For example, the brake control device onboard the vehicle 106E controls the brake to maintain a brake level of 10% until the vehicle 106E reaches the first transition point (shown in FIG. 4).

The brake control devices can maintain the brake level associated with the first transition point until directed to change by the controller. For example, the controller may communicate a brake command identifying a change in brake level (e.g., to 50%) associated with a second transition point 400 along the route. Responsive to receiving this brake command, the brake control devices can determine when the respective vehicles will reach the second transition point. Each of the brake control devices can control the respective brake to maintain the 40% brake level associated with the first transition point until the vehicle reaches the second transition point (where the brake level is changed to 50%).

The controller can communicate ramp up or ramp down rates in the brake commands in one embodiment. The ramp up rate instructs the brake control devices to control the brakes to increase the brake level to the new commanded brake level at a rate dictated by the brake command. The ramp down rate instructs the brake control devices to control the brakes to decrease the brake level to the new commanded brake level at a rate dictated by the brake command. Instead of controlling an air brake to immediately switch from a prior commanded brake level to the new commanded brake level, the brake control devices can gradually change the brake level applied by the brakes to the new level at the directed rate.

Figure 5:
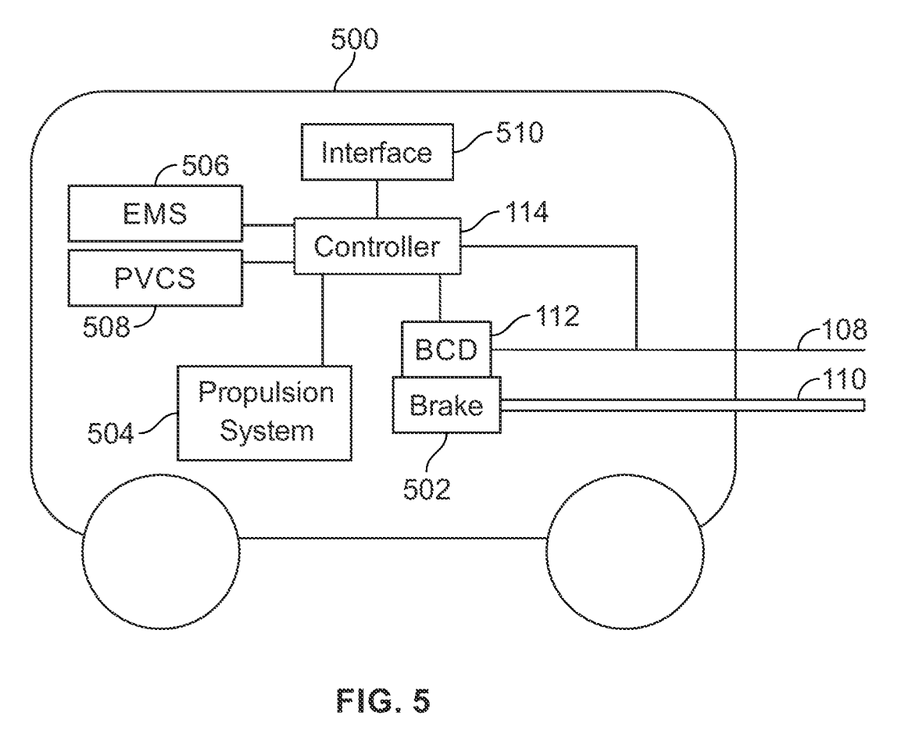
FIG. 5 illustrates one example of a propulsion-generating vehicle.

FIG. 5 illustrates one example of a propulsion-generating vehicle 500. The propulsion-generating vehicle can represent one or more of the vehicles 104 shown in FIG. 1, such as the vehicle 104A. The propulsion-generating vehicle includes the controller 114 that communicates with the brake control device 112 onboard the propulsion-generating vehicle to control engagement or release of a brake 502 of the propulsion-generating vehicle. For example, the brake control device can engage or release the air brake 502 coupled with the brake pipe 110 of the vehicle system 102 (shown in FIG. 1). The brake control device represents one or more processors that control valves of the brake to change the pressure in a brake cylinder to engage or release the brake, as well as to control the braking effort generated by the brake.

The brake control device and the controller can be coupled with the cable to communicate brake commands to other brake control devices in the vehicle system, as described herein. Optionally, the commands can be wirelessly communicated (e.g., using radios such as radio communications). The propulsion-generating vehicle includes a propulsion system 504 that represents one or more engines, generators, alternators, motors, or the like, that operate to propel the propulsion-generating vehicle.

The propulsion-generating vehicle can include an operator interface 510 that represents one or more input and/or output devices. For example, the operator interface can include an electronic display, a touchscreen, a keyboard, dials, joysticks, etc. that communications information to and receives information from the operator. The operator interface can receive the brake commands from the controller and present information to the operator based on the commands. For example, the operator interface can display a line graph, bar graph, or the like, that shows the brake levels in each segment of the vehicle. The operator interface can receive input from an operator via softkeys, the keyboard, dials, joysticks, etc. to set or define the boundaries of vehicle segments, which vehicles are to be included in one or more of the segments, the brake levels for one or more of the segments, the location of a transition point, etc.

The propulsion-generating vehicle optionally includes an energy management system 506 ("EMS" in FIG. 5) that generates and/or modifies trip plans for trips of the vehicle system. The energy management system can represent hardware circuitry that includes and/or is connected with one or more processors that create and/or change trip plans. The trip plans designate operational settings of the vehicle system for different times, distances, locations, or the like, along routes for a trip. These trip plans can be created to drive the vehicle system toward achievement of one or more objectives, as described above. The energy management system can communicate with the controller to allow the controller to send brake commands to the brake control devices of the vehicle system. These brake commands can be based on the brake settings, speeds, or the like, of the trip plan. For example, the controller can determine the different segments of the vehicle system for braking and the different brake levels for the different segments based on the trip plan. The controller can then create and send the brake commands to cause the brake system to apply the different brake levels within the different segments of the vehicle system to cause the vehicle system to move according to the trip plan.

The propulsion-generating vehicle optionally includes a positive vehicle control system 508 ("PVCS" in FIG. 5) that can restrict movement of the vehicle system based on movement authorities. The positive vehicle control system can represent hardware circuitry that includes and/or is connected with one or more processors that can receive signals from an off-board source (e.g., a back office server) via one or more wireless signals. These signals can indicate whether the vehicle system can enter into an upcoming portion of a route (e.g., a route segment, which is different from a segment of the vehicle system), whether the vehicle system is to reduce speed, or the like, to avoid collisions or coming too close to another vehicle system, to a maintenance crew on the route, etc. The controller can communicate with the positive control vehicle system to determine whether the vehicle system needs to slow down or stop movement. The controller can determine which segments of the vehicle system are to brake and the brake levels that are to be used by the different segments. The controller can then communicate the brake commands to the brake control devices onboard the vehicles to control the brake control devices to brake according to the segments and the brake levels, as described above.

Figure 6:
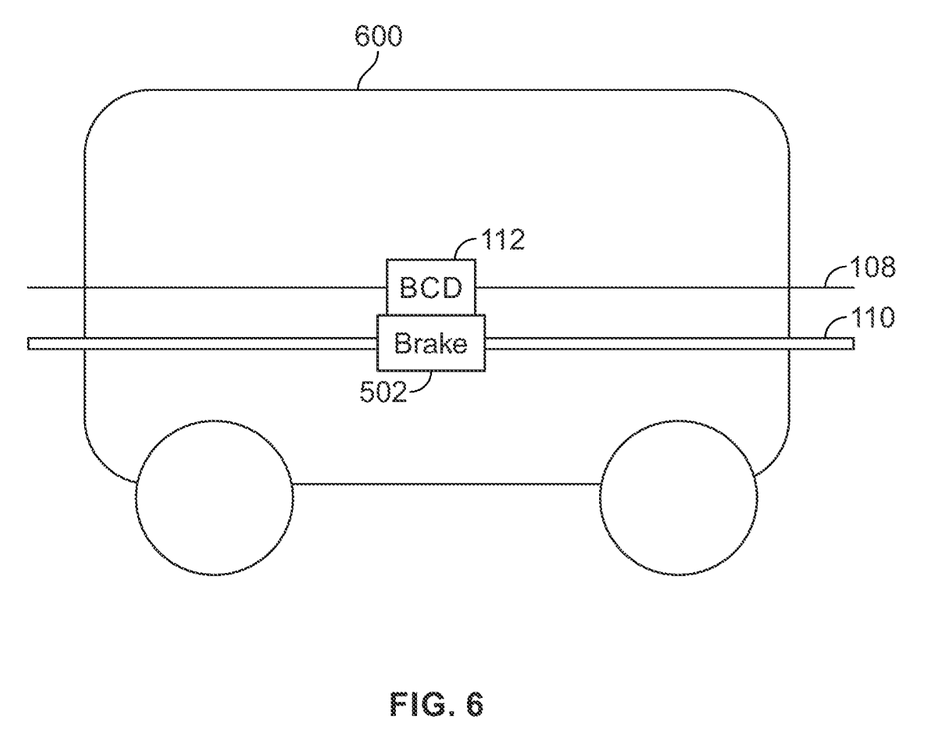
FIG. 6 illustrates one example of a non-propulsion-generating vehicle.

FIG. 6 illustrates one example of a non-propulsion-generating vehicle 600. The non-propulsion-generating vehicle can represent one or more of the vehicles 106 shown in FIG. 1. As shown, the non-propulsion-generating vehicle includes the brake control device 112 that receives brake commands from the controller of the controlling vehicle via the cable 108 or wirelessly (e.g., via radio communications) to control operation of the brake 502 onboard the non-propulsion-generating vehicle. As described above, the brake can be an air brake coupled with the brake pipe of the vehicle system.

Figure 7:
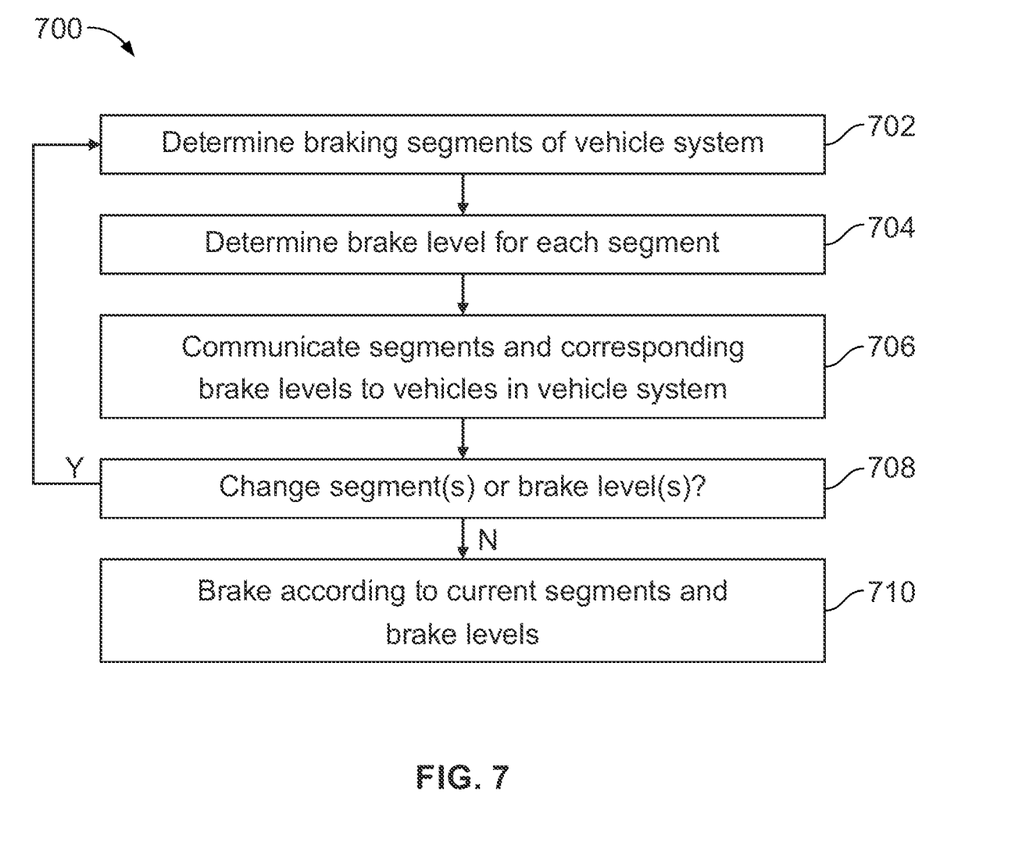
FIG. 7 illustrates a flowchart of one example of a method for controlling segmented braking of a vehicle system.

FIG. 7 illustrates a flowchart of one example of a method 700 for controlling segmented braking of a vehicle system. The method 700 can represent operations performed by the controller of the vehicle system. At 702, braking segments of the vehicle system are determined. For example, the boundaries between different groups of adjacent or neighboring vehicles can be defined between different segments, the positions of groups of vehicles in the vehicle system can be selected as different segments, the names and/or network addresses of different groups of the vehicles can be assigned to different segments, or the like. The segments can be identified or selected by an operator of the vehicle system, by the controller based on grades and/or curvatures of the route, by the controller based on a trip plan, by the controller based on output from the positive vehicle control system, or the like. The segments can be fixed block segments that do not change during movement of the vehicle system. Alternatively, the segments can be dynamic segments that change as the vehicle system moves. For example, the segments can change size by changing how many vehicles are in the segments at the leading and trailing ends of the vehicle system. As another example, the segments can change as the vehicle system moves by transition points. For example, each vehicle can change which segment the vehicle is in responsive to reaching or passing a transition point, as described above.

At 704, a brake level for each of the segments is determined. The operator or controller can determine the braking effort to be provided by the vehicles in each of the segments. At 706, a brake command is communicated to brake control devices onboard the vehicles in the vehicle system. The brake command can identify the different brake levels to be applied by the vehicles in the different segments. For example, the brake command can list vehicle positions within the vehicle system and corresponding brake levels for each vehicle position. As another example, the brake command can list groups of vehicle positions and a brake level for each of the groups. The brake command can be communicated to the brake control devices of the vehicles, which can determine what brake level to apply based on the position of the position of the vehicle. The vehicle system can then brake using the segments and brake levels of the segments.

At 708, a determination is made as to whether the vehicle segments are to change and/or a brake level of one or more of the segments is to change. For example, the controller may change which vehicles are included in one or more of the segments and/or may change the brake level to be applied by one or more of the segments. If a segment or brake level is to change, then flow of the method 700 can return toward 702. But, if the segments and brake levels are to remain in place, then flow of the method 700 can proceed toward 710. At 710, the vehicle system continues to brake using the segments and brake levels communicated at 706. Flow of the method 700 can then return to 702 if and when the segments and/or brake levels are to change. Optionally, flow of the method 700 can terminate.

In one embodiment, a braking system is provided that includes brake control devices configured to be disposed onboard different vehicles of a multi-vehicle system. Each of the brake control devices is configured to control application of a brake disposed onboard the respective vehicle of the vehicles. The vehicles in the multi-vehicle system are associated with different segments of the vehicle system. The braking system also includes a controller configured to send brake commands to the brake control devices. The brake commands direct the brake control devices of the vehicles to concurrently engage the brakes onboard the vehicles to different brake levels based on which of the segments that the vehicles are associated.

Optionally, the controller is configured to send the brake commands via one or more wired connections, wireless connections, or a combination of the wired connections and the wireless connections.

Optionally, the segments are fixed block segments and the controller is configured to assign each of the vehicles in the multi-vehicle system to one of the segments based on names of the vehicles, network addresses of the vehicles, or a combination of the names and the network addresses of the vehicles.

Optionally, the controller is configured to be disposed onboard a controlling vehicle of the vehicles and to send the brake commands from the controlling vehicle that dictate the brake levels to be used by the vehicles within each of the segments.

Optionally, the segments are dynamic segments and each of the brake control devices is configured to select which of the segments that the vehicle is included in based on a position of the vehicle within the multi-vehicle system.

Optionally, the vehicles included in one or more of the segments changes during movement of the multi-vehicle system, and the controller can be configured to associate the brake levels with different one of the segments such that, when the controller sends the brake commands, the brake control devices onboard the vehicles within the same segment apply the brakes to the brake level dictated by the controller for the respective segment.

Optionally, the brake control devices receive the brake commands that are sent for the segments and select which of the brake levels to apply based on which of the segments that the brake control devices are within.

Optionally, the controller is configured to determine boundaries between the segments of the multi-vehicle system, and the controller can be configured to change at least one of the boundaries to change which of the segments that one or more of the vehicles and the corresponding brake control device are associated.

Optionally, the controller is configured to send the brake commands for different transition points of a lead vehicle of the vehicles, and each of the brake control devices can be configured to determine, for the vehicle that the respective brake control device is located on, when the vehicle is at the corresponding transition point of the lead vehicle and to apply the brake on the vehicle according to the brake command associated with the transition point.

Optionally, the controller is configured to send a ramp up or ramp down rate to one or more of the brake control devices, and the one or more brake control devices can be configured to change the brake level of the brakes according to the ramp up or the ramp down rate responsive to one or more of the vehicles on which the one or more brake control devices are disposed changing between the segments in the multi-vehicle system.

Optionally, the segments are one or more of continuous segments each formed of two or more of the vehicles adjacent to each other, discontinuous segments each formed of two or more of the vehicles that are not adjacent to each other, or a combination of the continuous segments and the discontinuous segments Optionally, the controller is configured to determine the brake levels based on one or more of a trip plan or a control signal issued by a positive control system, where the trip plan dictates different operational settings as a function of one or more of time, location, or distance along a route, and the positive control system can issue the control signal to allow or prevent movement of the multi-vehicle system into or out of one or more portions of a route.

Optionally, the controller is configured to send the brake commands to the brake control devices to direct the brake control devices to concurrently engage the brakes onboard the vehicles to the different brake levels based on which of the segments that the vehicles are associated during a segmented mode of operation. The controller can be configured to send the brake commands to the brake control devices to direct the brake control devices to concurrently engage the brakes onboard the vehicles to the same brake level during a non-segmented mode of operation.

Optionally, the controller is configured to switch between the segmented mode of operation and the non-segmented mode of operation based on operator input.

Optionally, the controller is configured to switch between the segmented mode of operation and the non-segmented mode of operation responsive to the multi-vehicle system entering or encountering an emergency or fault state or situation.

Optionally, the controller is configured to assign at least one of the vehicles to two or more of the segments and the brake control device onboard the at least one of the vehicles is configured to determine which of the braking commands that the at least one of the vehicles is to implement.

In one embodiment, a method for controlling braking is provided. The method includes assigning vehicles in a multi-vehicle system to different segments of the multi-vehicle system and determining a brake level to be applied by a brake control device disposed onboard each of the vehicles in each of the segments. The brake level to be applied by the vehicles in a first segment of the segments differs from the brake level to be applied by the vehicles in a different, second segment of the segments. The method also includes concurrently engaging brakes of the vehicles in the segments according to the brake levels of the segments.

Optionally, the segments are fixed block segments and each of the vehicles in the multi-vehicle system is assigned to one of the segments based on brake commands sent from a controlling vehicle of the vehicles to other vehicles of the vehicles in the multi-vehicle system.

Optionally, the brake commands are sent from a controlling vehicle of the vehicles, the brake commands directing the brake levels to be used by the brake control device onboard each of the vehicles within each of the segments.

Optionally, the brake commands are sent via one or more wired connections, wireless connections, or a combination of the wired connections and the wireless connections.

Optionally, assigning the segments includes changing one or more of the segments during movement of the vehicle system.

Optionally, the method also includes (using the brake control device onboard each of the vehicles) selecting which of the segments that the vehicle is included in based on a position of the vehicle within the multi-vehicle system.

Optionally, determining the brake level includes associating the brake levels with the segments such that the brake control devices onboard the vehicles within the same segment apply the brakes to the brake level for the respective segment.

Optionally, the method also includes communicating the brake commands for different transition points of a lead vehicle of the vehicles, and (using the brake control devices) determining when each of the vehicles reaches the transition points based on positions of the vehicles in the vehicle system and a moving speed of the vehicle system. The brakes of the vehicles in the segments can be engaged according to the brake levels of the segments responsive to the vehicles reaching the respective transition points.

In one embodiment, a method for segmented braking in a multi-vehicle system is provided. The method includes assigning vehicles in the multi-vehicle system to different segments of the multi-vehicle system based on one or more of positions of the vehicles in the multi-vehicle system, names of the vehicles in the multi-vehicle system, or network addresses of the vehicles in the multi-vehicle system. The method also includes communicating a brake command to brake control devices onboard the vehicles from a lead vehicle of the vehicles via one or more wired connections, wireless connections, or a combination of the wired connections and the wireless connections. The brake command directs the brake control devices in a first segment of the segments to control brakes of the vehicles in the common segment to concurrently engage the brakes to a first brake level. The brake command also directs the brake control devices in a different, second segment of the segments to control the brakes of the vehicles in the second segment to concurrently engage the brakes to a different, second brake level.

Optionally, the segments are fixed block segments that remain constant during a trip of the multi-vehicle system.

Optionally, the segments are dynamic segments that change during a trip of the multi-vehicle system.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A braking system comprising:

brake control devices configured to be disposed onboard different vehicles of a multi-vehicle system, each of the brake control devices configured to control application of a brake disposed onboard the respective vehicle of the vehicles, the vehicles in the multi-vehicle system associated with different segments of the multi-vehicle system; and a controller configured to send a single brake command to the brake control devices, the single brake command including multiple command fields directing the brake control devices of the vehicles to concurrently engage the brakes onboard the vehicles to different brake levels based on which of the different segments that the vehicles are associated, wherein the brake control devices are configured to change which of the different vehicles are included in the different segments during movement of the multi-vehicle system along a route, wherein the brake control device of each different vehicle is configured to self-determine which of the one or more different segments the vehicle is associated with as the vehicle moves along the route.

2. The braking system of claim 1, wherein the controller is configured to send the single brake command via one or more wired connections, wireless connections, or a combination of the wired connections and the wireless connections.

3. The braking system of claim 1, wherein each of the brake control devices is configured to select which of the different segments that the vehicle is included in based on a position of the vehicle within the multi-vehicle system.

4. The braking system of claim 1, wherein the controller is configured to associate the brake levels with different one of the segments such that, when the controller sends the single brake command, the brake control devices onboard the vehicles within the same segment apply the brakes to the brake level dictated by the controller for the respective segment.

5. The braking system of claim 1, wherein the brake control devices are configured to receive the single brake command that is sent for the different segments and select which of the brake levels to apply based on which of the different segments that the brake control devices are within.

6. The braking system of claim 1, wherein the controller is configured to determine boundaries between the different segments of the multi-vehicle system, the controller configured to change at least one of the boundaries to change which of the different segments that one or more of the vehicles and the corresponding brake control device are associated.

7. The braking system of claim 1, wherein the controller is configured to send the single brake command for different transition points of a lead vehicle of the vehicles, and each of the brake control devices is configured to determine, for the respective vehicle that the brake control device is located on, when the respective vehicle is at the corresponding transition point of the lead vehicle and to apply the brake on the respective vehicle according to the brake command associated with the transition point.

8. The braking system of claim 1, wherein the controller is configured to send a ramp up or ramp down rate to one or more of the brake control devices, and the one or more brake control devices are configured to change the brake level of the brakes according to the ramp up or the ramp down rate responsive to one or more of the vehicles on which the one or more brake control devices are disposed changing between the different segments in the multi-vehicle system.

9. The braking system of claim 1, wherein the different segments are one or more of continuous segments each formed of two or more of the vehicles adjacent to each other, discontinuous segments each formed of two or more of the vehicles that are not adjacent to each other, or a combination of the continuous segments and the discontinuous segments.

10. The braking system of claim 1, wherein the controller is configured to send the single brake command to the brake control devices to direct the brake control devices to concurrently engage the brakes onboard the vehicles to the different brake levels based on which of the different segments that the vehicles are associated during a segmented mode of operation, the controller is configured to send the brake commands to the brake control devices to direct the brake control devices to concurrently engage the brakes onboard the vehicles to the same brake level during a non-segmented mode of operation.

11. The braking system of claim 10, wherein the controller is configured to switch between the segmented mode of operation and the non-segmented mode of operation responsive to the multi-vehicle system entering or encountering one or more of an emergency or fault state situation.

12. A method comprising:

assigning vehicles in a multi-vehicle system to different segments of the multi-vehicle system, wherein vehicles of the multi-vehicle system included in one or more of the different segments are configured to change during movement of the multi-vehicle system along a route;

determining a brake level to be applied by a brake control device disposed onboard each of the vehicles in each of the segments, the brake level to be applied by the vehicles in a first segment of the segments differs from the brake level to be applied by the vehicles in a different, second segment of the segments, wherein the brake control device of each different vehicle is configured to self-determine which of the one or more different segments the vehicle is configured to be associated with as the vehicle moves along the route;

sending a single brake command to the brake control devices, the single brake command including multiple command fields directing the brake control devices of the vehicles to engage the brakes disposed onboard the vehicles to different brake levels based on the different segments that the vehicles are associated; and concurrently engaging brakes of the vehicles in the segments according to the single brake command.

13. The method of claim 12, further comprising selecting which of the different segments that the vehicle is included in based on a position of the vehicle within the multi-vehicle system.

14. The method of claim 12, further comprising:

communicating the single brake command for different transition points of a lead vehicle of the vehicles; and determining when each of the vehicles reaches the transition points based on positions of the vehicles in the multi-vehicle system and a moving speed of the multi-vehicle system, wherein the brakes of the vehicles in the different segments are engaged according to the brake levels of the different segments responsive to the vehicles reaching the respective transition points.

15. A method for segmented braking in a multi-vehicle system, the method comprising:

assigning vehicles in the multi-vehicle system to different segments of the multi-vehicle system based on one or more of positions of the vehicles in the multi-vehicle system, names of the vehicles in the multi-vehicle system, or network addresses of the vehicles in the multi-vehicle system, wherein the different segments are configured to change during a trip of the multi-vehicle system; and communicating a brake command to brake control devices onboard the vehicles from a lead vehicle of the vehicles via one or more wired connections, wireless connections, or a combination of the wired connections and the wireless connections, the brake command directing the brake control devices of one or more vehicles in a first segment of the different segments to control brakes of the vehicles in the first segment to concurrently engage the brakes to a first brake level, the brake command also directing the brake control devices of one or more other vehicles in a different, second segment of the different segments to control the brakes of the vehicles in the second segment to concurrently engage the brakes to a different, second brake level; and changing a state of the brakes of the vehicles in the first segment responsive to the vehicles of the first segment transitioning out of the first segment of the different segments and into a second segment of the different segments.

16. The braking system of claim 1, wherein the brake control devices are configured to change a state of the brakes onboard the vehicles responsive to the vehicles moving out of a first segment of the different segments and into a second segment of the different segments.

17. The braking system of claim 5, wherein the brake control devices are configured to change which of the brake levels to apply responsive to the vehicles changing from one of the different segments to another of the different segments as the vehicles move along the route.

18. The method of claim 12, further comprising changing a state the brakes disposed onboard one or more of the vehicles responsive to the one or more vehicles moving out of a first segment of the different segments and moving into a second segment of the different segments.

19. The method of claim 15, further comprising changing a state of the brakes of the vehicles in the second segment responsive to the vehicles of the second segment transitioning out of the second segment of the different segments and into a third segment of the different segments.

* * * * *